United States Patent Office 3,308,150
Patented Mar. 7, 1967

3,308,150
DITHIOCYANATE OF $C_8$ CYCLO OLEFINIC HYDROCARBONS AND METHODS
Eldon E. Stahly, 2812 NE. 27th St.,
Pompano Beach, Fla. 33062
No Drawing. Filed July 24, 1963, Ser. No. 297,455
6 Claims. (Cl. 260—454)

This invention relates to new compositions of matter, the dithiocyanates of cyclo $C_8$ hydrocarbons, and methods for making them.

The dithiocyano derivatives of unsaturated cyclo $C_8$ hydrocarbons are useful as active ingredients in insecticidal compositions, and, as intermediates in the preparation of disulfonic acids, which are useful in the detergent industry. The compounds may also be isomerized to diisothiocyanates by heat and the diisothiocyanates may be reduced to diamino derivatives of cyclo $C_8$ hydrocarbons. The dithiocyanated cyclooctenes may also serve as intermediates for preparing tetrathiocyano-cyclooctanes. These compounds are also useful as pesticides.

Illustrative of the compositions of this invention are the compounds 1,4-dithiocyanocyclooctene-2

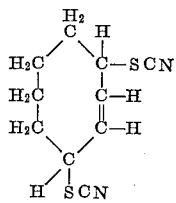

1,2-dithiocyanocyclooctene-5

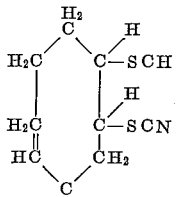

and 1,2-dithiocyanocyclooctane

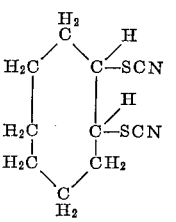

By the reaction of this invention, two thiocyano groups are added to two ethylenic carbon atoms either in the 1,2- or 1,4-position relative to each other, i.e. addition of the thiocyano-group to a 1,5-diene results in 1,2-substitution because only one double bond is affected in the reaction; the other double bond remains unreacted because the dithiocyanate is insoluble in the reaction mixture. In conjugated polyene systems, e.g. 1,3-cyclooctadiene, 1,4-addition occurs. When, therefore, cyclooctene is reacted with nascent thiocyanogen, 1,2-dithiocyanocyclooctane is produced; when 1,5-cyclooctadiene is reacted, 1,2-dithiocyanocyclooctene-5 is produced; and, when 1,3-cyclooctadiene, a conjugated polyene, is reacted, 1,4-dithiocyanocyclooctene-2 is produced.

The dithiocyanates of the invention may be prepared by reacting the cyclo $C_8$ hydrocarbons with nascent thiocyanogen, i.e. thiocyanogen in which (—SCN) groups are present as well as the $(SCN)_2$ molecule. The invention involves reacting unsaturated cyclo $C_8$ hydrocarbons such as 1,3-cyclooctadiene; 1,5-cyclooctadiene or cyclooctene with nascent thiocyanogen.

The nascent thiocyanogen may be obtained in situ by the reaction between copper sulfate and sodium thiocyanate. Alternatively, nascent thiocyanogen may be produced in situ by reacting cupric sulfate with sodium thiocyanate in anhydrous glacial acetic acid or by adding bromine to an anhydrous suspension of plumbous thiocyanate in benzene.

The reaction may take place, for instance, in a solvent medium, e.g. ethanol, at a temperature between about 0 and 100° C. for a period of about 5 to 180 minutes. The product may then be recovered from the solution by extraction with a suitable solvent, e.g. benzene. Preferably the reaction takes place at a temperature between about 25 and 50° C. for a period of about 1 to 2 hours.

The following examples of the invention are illustrative only and are not to be considered as limiting.

*Example I.—1,2-dithiocyanocyclooctene-5*

A mixture of 175 parts of sodium thiocyanate, 450 parts ethanol (95%) and 27 g. cyclooctadiene-1,5 was agitated mechanically at 30° C. in a 2-liter vessel. A solution of 250 parts of copper sulfate pentahydrate in 460 parts water at 70° C. was added dropwise over a period of about 1 hour, during which an initially dark brown color of the suspension of cupric dithiocyanate gradually turned lighter. At the end of the addition, the temperature of the mixture was 43° C. Stirring was continued for 30 minutes at which time the color was light yellow, the color of cuprous thiocyanate. Four hundred thirty-five parts of benzene were added and vigorous stirring was continued 15 minutes. The mixture was then filtered; the aqueous layer of the filtrate was recombined with the solid from the filter, replaced in the flask, and extracted again with 435 parts fresh benzene. The benzene layer of the second filtrate was combined with the benzene layer of the first filtrate, and the resultant benzene solution was shaken with 260 parts of 10% soda ash solution. The washed benzene layer was then filtered and concentrated by evaporation or distillation under 25 mm. pressure at 25 to 80° C. Seventy-two parts of a reddish oil remained. Further concentration was effected by evaporation at 30° C. and 5 mm. Fifty grams remained which, upon standing, deposited 30 g. of plate-like crystals. The red oil remaining was decanted. The crystals melted at 55 to 60° C. A few of the crystals were rinsed with a mixture of pentane and isopropanol. The melting point was then 59 to 61° C. Analysis of both the oil and crystals for sulfur and nitrogen corresponded to the composition required for 1,2-dithiocyanocyclooctene-5, that expected of reaction of one double bond of 1,5-cyclooctadiene. The theoretical content of sulfur and nitrogen are respectively 28.58% and 12.49%. The oil has a density $D_5{}^{25}$ of 1.22 and a refractive index $n_D{}^{30}$ of 1.575.

*Example II.—1,4-dithiocyanocyclooctene-2*

Example I was repeated except that 27.2 g. of cyclooctadiene-1,3 was substituted for the cyclooctadiene-1,5. The evaporation of the benzene extract produced 40 g. of red oil having $n_D{}^{30}$ of 1.5865 and $D_{25}{}^{25}$ of 1.16. Analysis for nitrogen and sulfur corresponded to 1,4-dithiocyanocyclooctene-2 of about 95% purity.

*Example III.—1,2-dithiocyanocyclooctane*

A mixture of 18 parts NaSCN, 5.5 parts cyclooctene, and 45 parts of 95% ethanol was shaken in a bottle, and a solution of 25 parts copper sulfate pentahydrate in 45 g. water at 75° C. was added dropwise while shaking over a period of 4 minutes. 25 parts 95% ethanol were then added and shaking was continued for six minutes.

Then 87 parts of benzene were added, well shaken and filtered, and the benzene layer was separated. The water layer of the filtrate and yellow cuprous thiocyanate were extracted again with 87 parts benzene, and the two benzene layers were combined, filtered and washed with 25 parts of 10% soda ash solution. The washed benzene solution was filtered and evaporated overnight at 30° C. and 2 mm. pressure. Five parts of a red-yellow oil remained, density at 25° C. was 1.15 and $n_D^{30}$ was 1.553; analysis obtained for sulfur and nitrogen corresponded to 1,2-dithiocyanocyclooctane of 85% purity. This oil partially crystallizes at 0° C. and is melted completely by warming to 35° C.

What is claimed is:

1. The dithiocyanate selected from the group consisting of

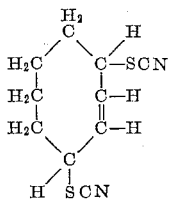 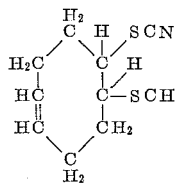 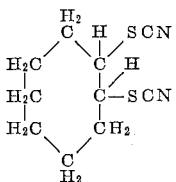

2. 1,4-dithiocyanocyclooctene-2.
3. 1,2-dithiocyanocyclooctene-5.
4. 1,2-dithiocyanocyclooctane.
5. A method for preparing dithiocyanates of cyclo $C_8$ olefine hydrocarbons which comprises reacting cyclo $C_8$ olefine hydrocarbons of the group consisting of cyclooctene, 1,3-cyclooctadiene and 1,5-cyclooctadiene with thiocyanogen at a temperature of about 0 to 100° C.
6. The method of claim 5 in which the thiocyanogen is produced in situ by reacting copper sulfate with sodium thiocyanate.

References Cited by the Examiner
UNITED STATES PATENTS
2,374,136  4/1945  Rothrock _____ 260—454

FOREIGN PATENTS
579,818  7/1933  Germany.
1,055,288  10/1959  Germany.

CHARLES B. PARKER, *Primary Examiner.*

JOSEPH P. BRUST, *Examiner.*

D. R. MAHANAND, R. L. RAYMOND,
*Assistant Examiners.*